March 23, 1965 K. EICKMANN 3,174,432
COMBUSTION ENGINE FOR CONVEYING A HYDRAULIC PRESSURE MEDIUM
Filed Aug. 1, 1961 14 Sheets-Sheet 1

March 23, 1965 K. EICKMANN 3,174,432
COMBUSTION ENGINE FOR CONVEYING A HYDRAULIC PRESSURE MEDIUM
Filed Aug. 1, 1961 14 Sheets-Sheet 4

Inventor
Karl Eickmann
by Michael S. Striker
Attorney

March 23, 1965 K. EICKMANN 3,174,432
COMBUSTION ENGINE FOR CONVEYING A HYDRAULIC PRESSURE MEDIUM
Filed Aug. 1, 1961 14 Sheets-Sheet 5

March 23, 1965 K. EICKMANN 3,174,432
COMBUSTION ENGINE FOR CONVEYING A HYDRAULIC PRESSURE MEDIUM
Filed Aug. 1, 1961 14 Sheets-Sheet 10

March 23, 1965 K. EICKMANN 3,174,432
COMBUSTION ENGINE FOR CONVEYING A HYDRAULIC PRESSURE MEDIUM
Filed Aug. 1, 1961 14 Sheets-Sheet 13

Inventor
Karl Eickmann
By Michael S. Striker
Attorney

March 23, 1965 K. EICKMANN 3,174,432
COMBUSTION ENGINE FOR CONVEYING A HYDRAULIC PRESSURE MEDIUM
Filed Aug. 1, 1961 14 Sheets-Sheet 14
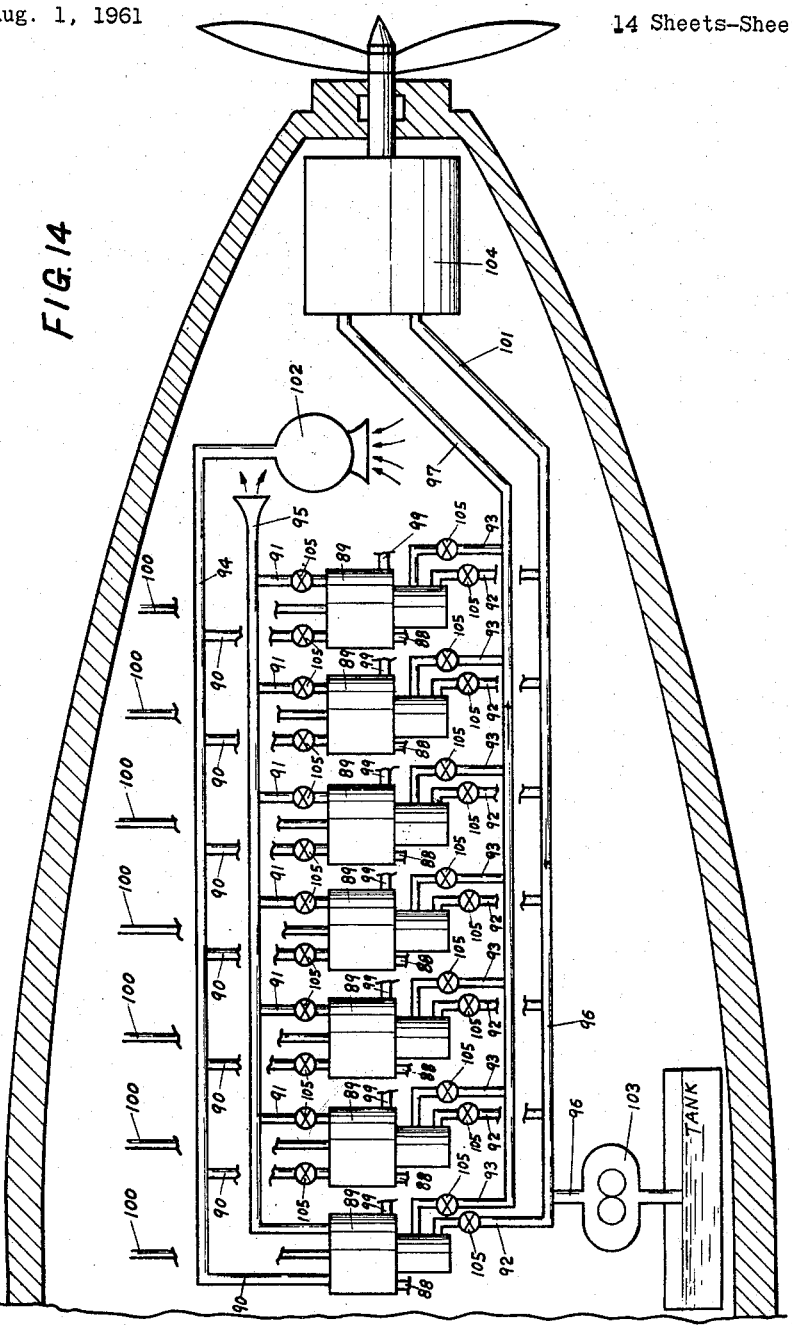

3,174,432
COMBUSTION ENGINE FOR CONVEYING A HYDRAULIC PRESSURE MEDIUM
Karl Eickmann, 2420 Ishiki, Hayama-machi,
Miuragun, Kanagawa-ken, Japan
Filed Aug. 1, 1961, Ser. No. 128,490
Claims priority, application Switzerland, Aug. 12, 1960,
9,162/60
3 Claims. (Cl. 103—50)

The present invention relates to internal combustion engines in which the combustion process occurs in the usual manner as, for example, in Otto or diesel engines, but in which the reciprocating movement of the piston in the cylinder is not utilized for driving a crankshaft but for driving one or more pump pistons which first exert a suction upon a hydraulic medium and then propel this this medium away under pressure and thus operate like a pump. In combustion engines of the conventional type the energy which is produced by the combustion process is converted in the cylinder itself into the driving stroke of the piston which is then usually connected by means of connecting rod pins and connecting rods to the crankshaft to rotate the same.

The end of the crankshaft extends from the crankcase and usually serves to deliver the output of the engine for driving, for example, vehicles, machines, ships, airplanes, or the like. The connecting rod and the crankshaft are subjected to mechanical friction in their bearings which reduces the efficiency of the combustion engine.

Further losses usually occur in the transmission of the output from the combustion engine to the driven elements, for example, in a motor vehicle, in the gears between the combustion engine and the vehicle wheels.

In the conventional combustion engines it is a further disadvantage that the crankshafts cannot be built of an unlimited size. If the engine comprises several cylinders, these cylinders usually act upon the same crankshaft. The more cylinders the engine contains, the greater will be the output which has to be transmitted by the crankshaft and therefore the stronger the crankshaft must be. Such an increase in the strength of the crankshaft is, however, restricted by certain limits in dimensions, difficulty of construction, and costs. It is therefore commercially an absurdity to build combustion engines with crankshafts and, for example, several hundred cylinders in one and the same engine since the construction of the necessary crankshafts would be practically impossible.

The need for engines with a high output, for example, of ten thousand H.P. and more, for driving ships and the like therefore makes it necessary to build engines with a limited number of cylinders, for example, seven to twelve cylinders, but of considerable dimensions. On the other hand, many small engines of a low horsepower are required, for example, for driving bicycles or the like. The requirements which must be observed in the construction of crankshafts have made it necessary to develop a multitude of different types of internal combustion engines and of engines of different dimensions for different outputs.

This necessarily means an uneconomical production as a whole and it requires a great investment of capital for the production of the various types and sizes of engines and of the machines required for producing the same.

It is the principal object of the present invention to avoid the various disadvantages of the conventional internal combustion engines operating with crankshafts.

According to the invention, the main piston is connected to one or more pump pistons which produce in a pump one or more hydraulic pressure currents. For this purpose the oscillating movement of the main piston may be utilized directly without requiring any conversion of the oscillating movement into a rotary movement. Consequently, the entire friction which is produced in the conventional engines by the respective elements for carrying out this conversion, for example, connecting rod pins, connecting rods, and crankshaft bearings, is completely avoided and the overall efficiency of the combustion engines is considerably increased. Furthermore, the high cost of production of the crankshafts, connecting rod pins, connecting rods, crankcases, etc. will be saved.

According to the invention it is further possible to build combustion engines of any desired output. Thus, for example, it is possible according to the invention to employ cylinders of a standard size for producing engines of entirely different outputs. This may be attained by employing any desired number of combustion engines of the inventive design, all of which pump into a common pressure line. There is no limit to the number of cylinders which may be used. If, for example, a combustion engine according to the invention has an output of X H.P. and a certain number Q of such engines with an output X are connected in series, they would produce in a common pressure line a total output of $Q \times X$. If the engine according to the invention has, for example, a standard output of 7 H.P., for example, for driving a small motorcycle, and if 4,000 of such engines are connected in series, they would produce a total output of, for example, 28,000 H.P. which is sufficient to drive a giant ship of 100,000 tons. A further advantage attained according to the invention by connecting the combustion engines in series consists in the fact that individual damaged engines may be disconnected from the common pressure line, for example, by shut-off valves, and may be repaired while the other engines continue to operate without requiring the operation of a driven unit, for example, a vehicle, machine, ship, or airplane to be stopped.

The energy of the pressure medium which is produced by the combustion engines according to the invention may be converted at any desired point into the desired working movement by means of hydraulic cylinders or hydraulic rotary engines, for example, oil engines.

A further important advantage of the new engine according to the invention is the fact that the volume of the pressure medium produced may be controlled. This control may be very simply attained by an adjustment of the stroke of the enginelike pump pistons. Furthermore, the control of the current of pressure medium may be infinitely variable. For this purpose, the supporting means of the pump cylinders may be designed so as to be adjustable.

While the engine is being started and running idle, the volume of pressure medium may be set to zero.

The control mechanism for regulating the volume of pressure medium also permits the usual clutch and gears subsequent to the engine to be omitted.

If a cam control for the pump pistons or pistons is applied, the pressure-by-volume characteristic resulting from the thermodynamic conditions in the main engine cylinder may be very accurately transferred to the power-times-distance conditions of the pump piston which cannot be achieved in crankshaft engines which are dependent upon the crankshaft kinematics.

In other kinds of pump pistons and pump cylinder bearings according to the invention it is possible to limit the rocking movement about the bearing pins to less than 160°, whereas the crankshafts of former 2-cycle engines required a rotation of 360° and those of 4-cycle engines a rotation of 720°. The friction occurring in the power-transmitting mechanism is therefore reduced according to the invention by more than one-half.

The aforementioned as well as a considerable number of additional objects, features, and advantages of the present invention will become further apparent from the following detailed description thereof, particularly when the same is read with reference to the accompanying drawings, in which—

FIGURE 13 shows a modification of the engine according to the invention which is provided with a pumping device for the pressure medium within the piston of the combustion engine; while FIGURE 14 shows an engine battery according to the invention consisting of a number of combustion engines which are connected in series.

Figure 1:
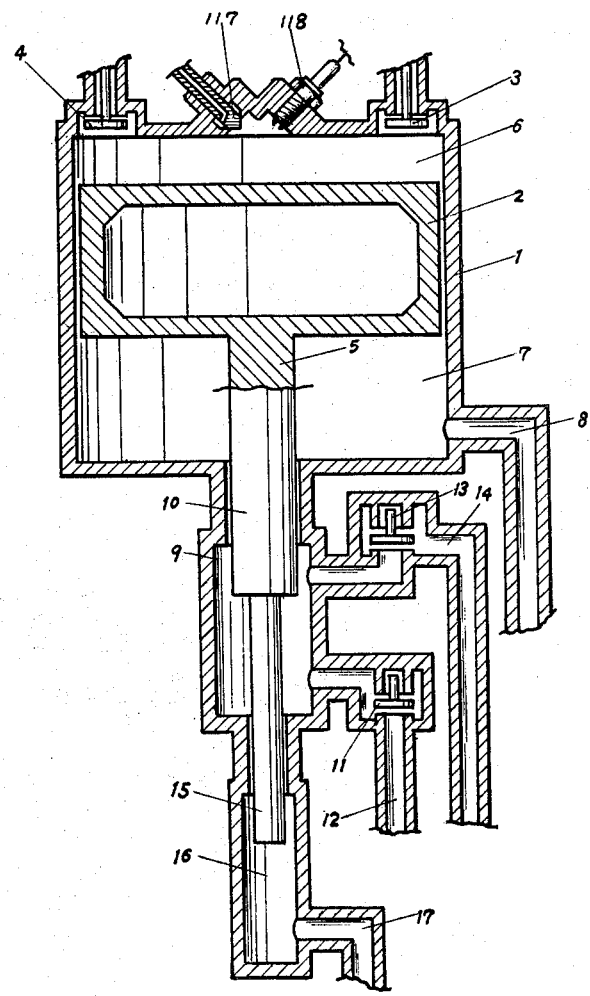
FIGURE 1 shows a cross section of a combustion engine according to a first embodiment of the invention.

Referring first to FIGURE 1 of the drawings, the internal combustion engine 1 according to the invention has a combustion chamber 6 in which the combustion occurs in the conventional manner. The combustion may occur either by the constant-pressure process or by the constant-volume process or by a mixed process. The ignition of the fuel also occurs in a conventional manner either by an ignition of the compressed mixture of fuel and air or by the injection of fuel into the compressed air as in a diesel engine. The combustion chamber 6 is therefore equipped in the usual manner either with sparkplugs 118 or with injection nozzles 117. As indicated diagrammatically in the drawing, combustion chamber 6 is further provided with conventional injection valves 3 and exhaust valves 4 which operate in the usual manner. Piston 2 also compresses air or a fuel mixture in the usual manner and the combustion process also occurs in the combustion chamber 6 in the manner as usual in combustion engines. Under the action of the pressure occuring in the combustion chamber during and after the combustion, piston 2 carries out a downward stroke in cylinder 1. The lower end of this cylinder is, however, not open but closed and provided with central guiding means for the piston rod 5. A further chamber 7 is thus formed in cylinder 1 underneath piston 2 and the volume of this chamber increases and decreases during the reciprocating strokes of piston 2. This chamber 7 may be utilized as a second combustion chamber or as a supercharger or as an air pump or as a pump for the fuel and air mixture. Chamber 7, may, however, also be connected with the outer atmosphere by a channel 8.

Piston rod 5 forms an extension of piston 2 and is coaxial therewith. It is slidable within a lower piston-rod guide on cylinder 1 and reciprocates together with piston 2. The lower end 10 of piston rod 5 passes into a pump chamber 9 which is connected by a line 12 to a source of pressure medium, for example, an oil tank. During the upward stroke of the end 10 of the piston rod the pressure medium is sucked into pump chamber 9 through the induction valve 11 which closes at the end of the stroke. During the downward stroke of piston 2 in combustion chamber 6 under the action of the combustion pressure the lower end 10 of the piston rod forces at least a part of the pressure medium from pump chamber 9 through the delivery valve 13 into the pressure line 14 from which it may then be conducted to hydraulic cylinders or engines for driving the same.

For effecting the compression stroke of piston 2, special means are provided which according to the embodiment as shown in FIGURE 1 consists of a piston rod extension 15 of a reduced diameter which is movable into a further pump chamber 16. If the pressure medium is passed through line 17 into pump chamber 16, it presses against the piston rod extension 15 and forces the same out of chamber 16. This results in the upward or compression stroke of piston 2 and also in the suction stroke in piston chamber 9.

Figure 2:
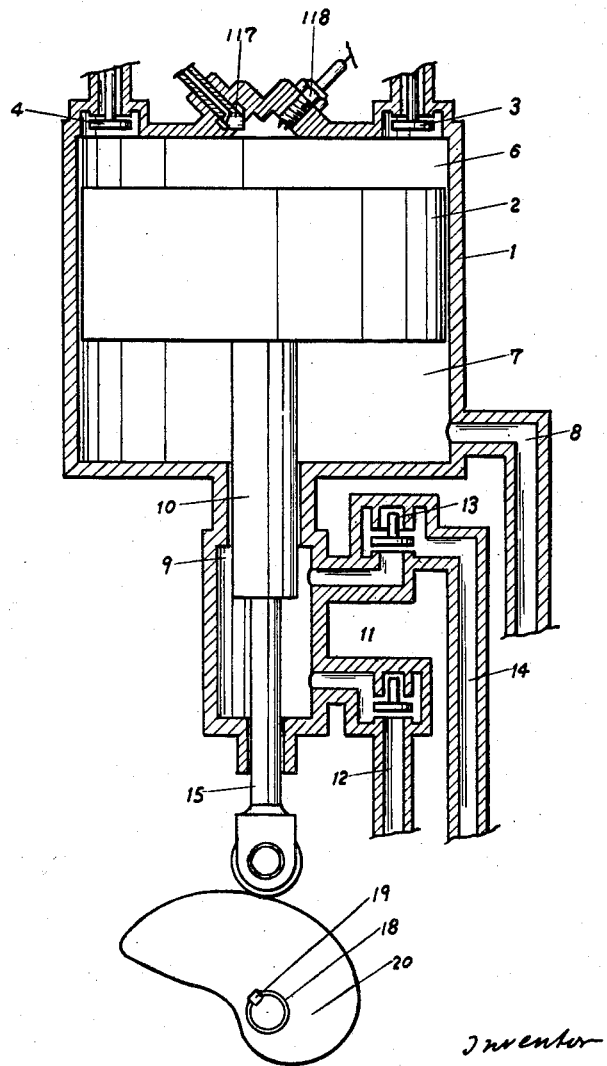
FIGURE 2 shows a modification of the engine and the control for the compression movement thereof.

Instead of effecting the compression stroke hydraulically, it is, of course, also possible to do this by mechanical means as illustrated, for example, in FIGURE 2. In this case, the piston rod extension 15 projects from pump chamber 9 to the outside and slides or rolls along a cam 20 which is secured by a key 19 on a cam shaft 18. The end 15 of the piston rod may then be provided with a roller or similar means for reducing the friction on cam 20. This cam 20 may be designed so as to effect the compression or upward stroke of piston 2 through its piston rod 15 at the proper time and for the proper distance as may be desired or required.

It is also possible to control several cylinders together either by mechanical or hydraulic means. One of the many possibilities of doing this is illustrated, for example, in FIGURE 3. The piston rod ends 15 of three different engine cylinders are movable into three different displacement chambers 16 which are connected by pressure lines 37 to displacement chambers 25 in which the displacement pistons 26 are movable in the axial direction while closing chambers 25 tightly. Cams 23 may be of such a shape that the product of force-times-distance of the respective compressing piston remains constant so as to insure that the camshaft will be driven at a uniform output.

According to other embodiments of the invention, the cams may also be specially designed to effect another force-times-distance characteristic during the compression. If, for example, a very high compression is desired in the cylinder for increasing the thermodynamic efficiency, the period of the compression stroke may be shortened by a suitable cam shape. It is thus possible to reduce the leakage losses between cylinder 1 and piston 2 and to increase the thermal and the total efficiency of the combustion engine.

Figure 3:
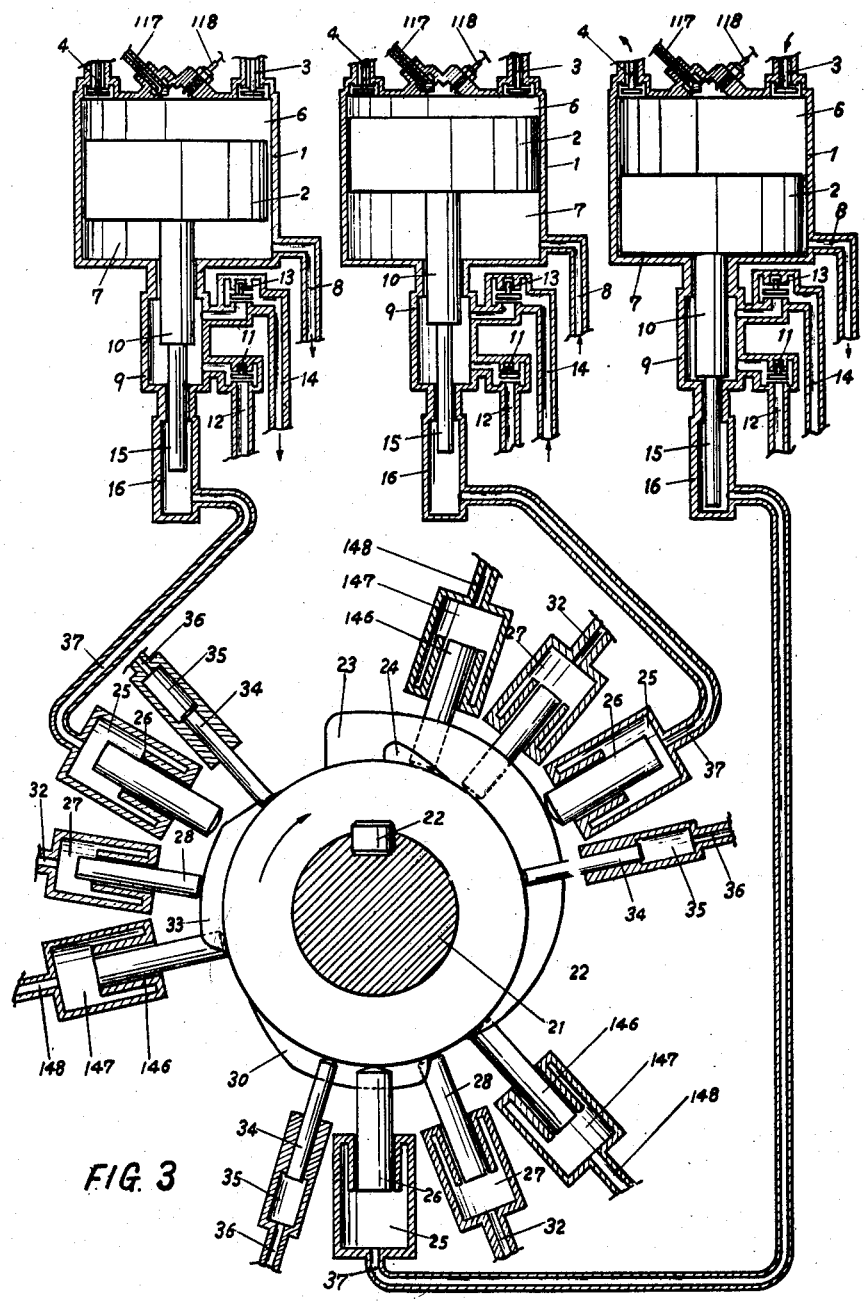
FIGURE 3 shows another modification of the engine according to the invention and of the control of the compression process thereof, in which the individual parts which are disposed in different planes are shown in sections extending through the center lines.

As illustrated in FIGURE 3, different cam disks are secured axially behind each other on a camshaft 21 by means of a key 22. If shaft 21 rotates, cam 23 slides successively along the three different displacement pistons 26 which when moved by cam 23 displace the pressure medium from the displacement chamber 25 and force the same through line 37 into the displacement chamber 16 in which the compression or upward stroke of piston 2 is then effected in the manner as already described. If, for example, as illustrated in FIGURE 3 three different displacement pistons 26 are staggered relative to each other at an angle of 120°, they will control the compression strokes of the three different cylinders in a uniform order of succession. The displacement pistons 26 may, in turn, be provided with means for reducing the friction. The arrangement is by no means limited to the use of three cylinders but any larger number, for example, z cylinders may be provided which are staggered in a suitable manner at an angle of $360 \div z$ degrees relative to each other.

Camshaft 21 may be provided with further cam disks 24, 30, or 33 which are disposed behind each other in the axial direction of the camshaft. Cam 24 may then actuate, for example, the fuel injection or the spark ignition through the displacement pistons 34, the displacement chambers 35, and the pressure lines 36.

Cams 33 may then transmit hydraulic impulses to the injection valves 3 and open the latter, for example, through the displacement pistons 28, displacement chambers 27, and pressure lines 32. Cams 30 may actuate, for example, the exhaust valves 4 by means of further displacement pistons 146, displacement chambers 147, and pressure lines 148.

Figure 4:
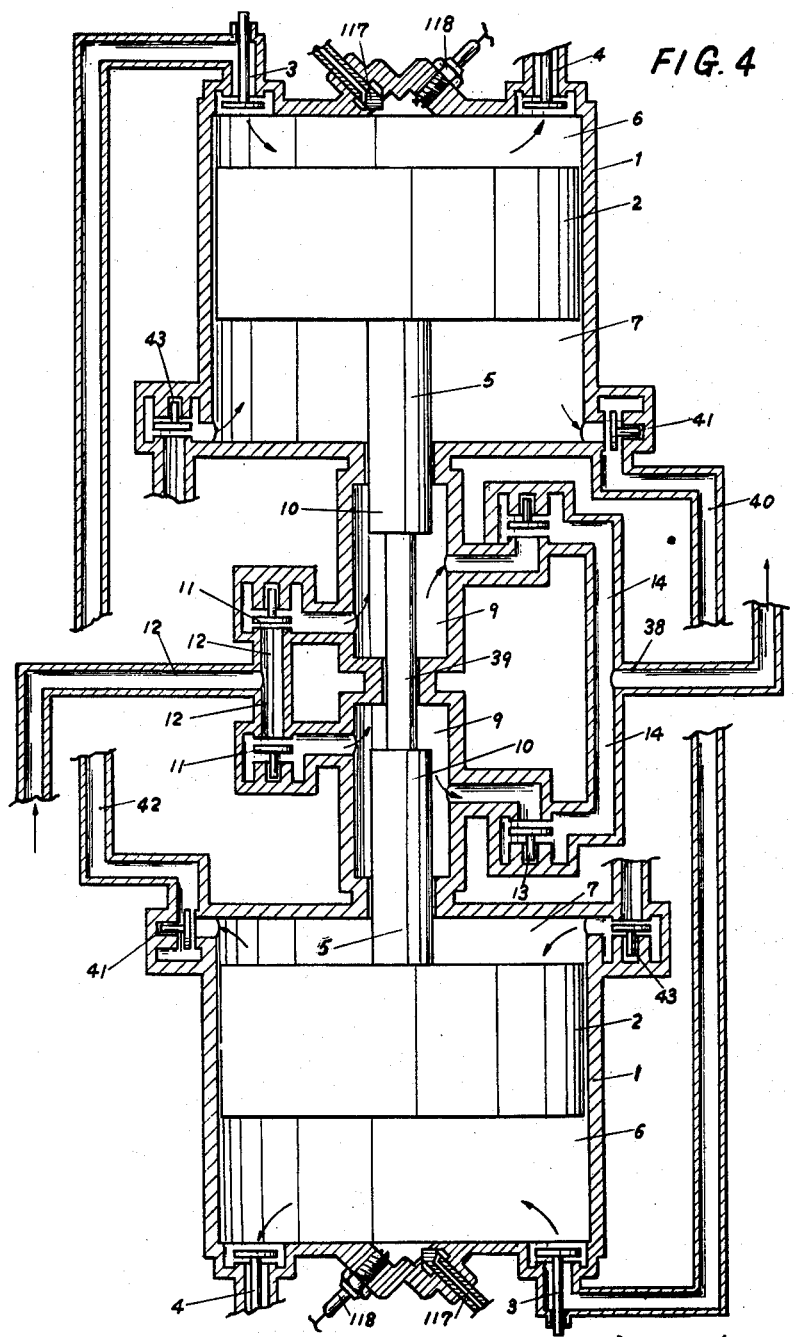
FIGURE 4 shows a further modification of the engine according to the invention.

As illustrated in FIGURE 4, it is also possible to arrange two different cylinders 1 coaxially with each other so that two pistons 2 are movable therein, the ends 10 of which operate in the manner as described with reference to FIGURE 1 in pump chambers 9 from which the pressure medium is pumped into the pressure lines 14 which may be combined into a common pressure line 38. The two pistons 2 with their piston rods 5 are then connected to each other by the common piston rod 39 so that both pistons 2 and the parts thereof always carry out the same movements along the same common center line. By such an arrangement it is possible to save special auxiliary devices for effecting the compression stroke of the pistons if the kinetic energy of the piston arrangement is utilized which is produced by the combustion in the first cylinder in order to effect the compression stroke in the second cylinder or vice versa. In this embodiment of the invention, chamber 7 underneath the piston in the first cylinder may be connected, for example, by a channel 40 through the injection valve 3 to the combustion chamber 6 of the second cylinder. If, in addition, a check valve 41 is installed in line 40, pre-compressed air or a precompressed mixture of fuel and air will be stored up in line 40 and will subsequently flow into the combustion chamber of the second cylinder when the injection valve 3 of the latter is opened. In reverse, pre-compressed air or a precompressed mixture of air and fuel may be passed from chamber 7 of the second cylinder through a channel 42 and the injection valve 3 of the first cylinder into the combustion chamber 6 of the first cylinder. Chambers 7 in both cylinders may be provided with injection valves 43 for filling the chambers.

Figure 5:
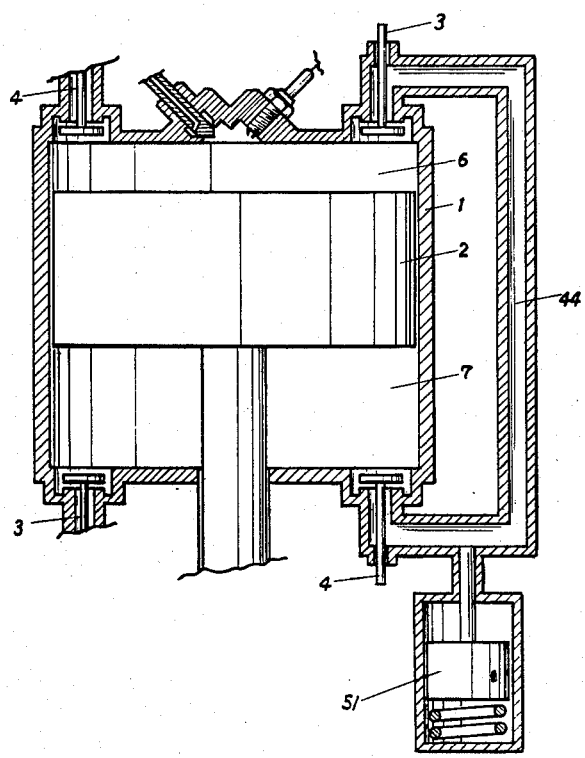
FIGURE 5 shows another modification of the engine according to the invention.

If the ignition and the valve control are properly associated with the forces acting on the different parts of the pistons, the embodiment according to FIGURE 4 has the advantage that no mechanical connecting rods and the like are required and that intermediate the combustions the free flight of the pistons and piston parts in association with each other produces at different times near its opposite ends a pressure in pump chambers 9 almost without any mechanical losses. According to another embodiment of the invention, as illustrated in FIGURE 5, chamber 7 in cylinder 1 is likewise provided with induction valves 3 and outlet valves 4. Chamber 7 may communicate with the combustion chamber 6 through the outlet valve 4, a channel 44, and the injection valve 3. When piston 2 moves upwardly, air or a mixture of fuel and air is precompressed in the cylinder chamber 7 and passes through the outlet valve 4 into channel 44 and into a pressure-accumulator 51 from which it passes subsequently into the combustion chamber 6 after the inlet valve 3 is opened. Chamber 7 may be provided with an inlet valve 3 for charging chamber 7 with fresh air or a mixture of fuel and air.

Figure 6:
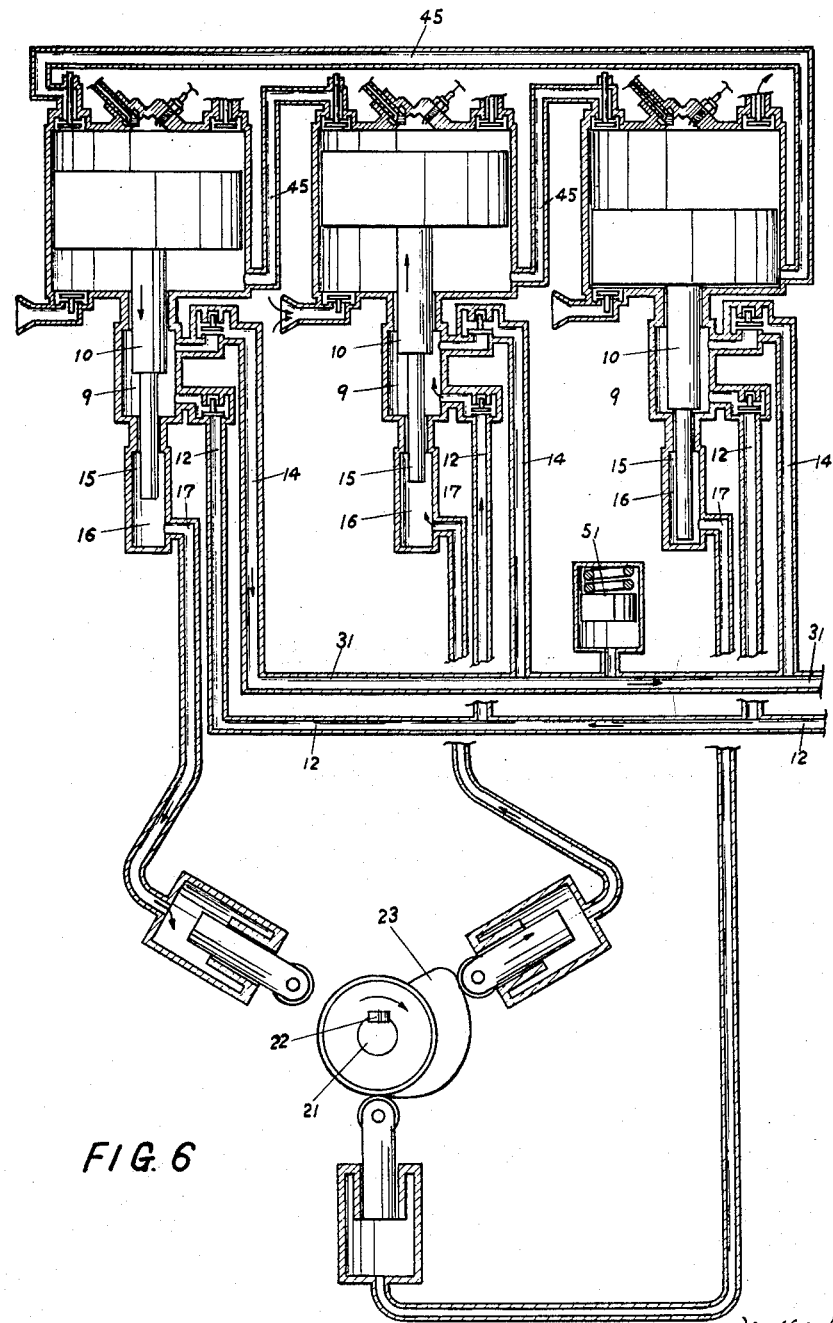
FIGURE 6 shows a modification in which several engines according to the invention are connected in series.

The manner in which a plurality of cylinders may be connected in series is illustrated, for example, in FIGURE 6. According to this embodiment, all pistons pump the pressure medium through the pressure lines 14 into a common collecting line 31. The remainder of the control of the pistons may be similar as described with reference to FIGURE 3. Thus, there may be again a camshaft 21 which is provided with cams for controlling the various other movements and for transmitting these movements mechanically or hydraulically to the respective places of the engines. If the cylinders are connected in series as shown in FIGURE 6, it is possible to connect the cylinder chambers 7 through lines 45 to the combustion chambers 6 of later-acting cylinders. Lines 45 may lead, for example, from cylinder 1 to cylinder 2 or from cylinder 1 to cylinder 3 or also from cylinder 1, for example, to cylinder 5 dependent upon the timed succession of the ignitions and the work strokes of the pistons. Irregularities in the conveyance of the combined hydraulic pressure current in the collecting line 31 may be reduced by a hydraulic accumulator 51 of a conventional type.

Figure 7:
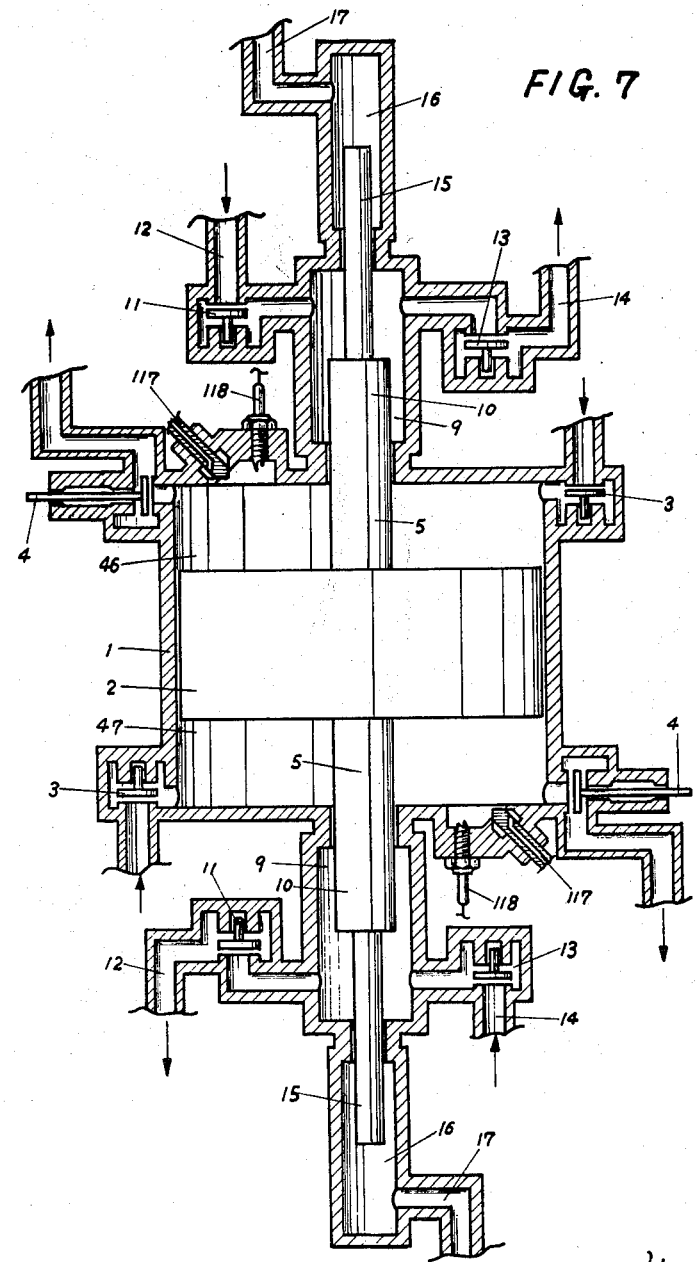
FIGURES 7 to 10 show four further modifications of the engines according to the invention.

Another possibility of arrangement is illustrated in principal in FIGURE 7 in which cylinder 1 is provided at both ends with injection valves 3 and outlet valves 4. Cylinder 1 contains only one piston 2 with piston rods 5 on its opposite sides which engage with their pump pistons 10 into pump chambers similarly as in the embodiment according to FIGURE 1. Cylinder 1 contains at both sides of piston 2 the chambers 46 and 47. If a combustion occurs in chamber 46, a compression occurs in chamber 47, while if a combustion occurs in chamber 47, a compression occurs in chamber 46. For charging the chambers 46 and 47, suitable charging means may be applied which may be either of a conventional type or of the type as already described. The compression processes may be aided by the pressure cylinders 16. If for the compression only the kinetic energy of piston 2 is utilized, the cylinders 16 as shown in FIGURE 7 together with lines 17 may be omitted.

Figure 8:
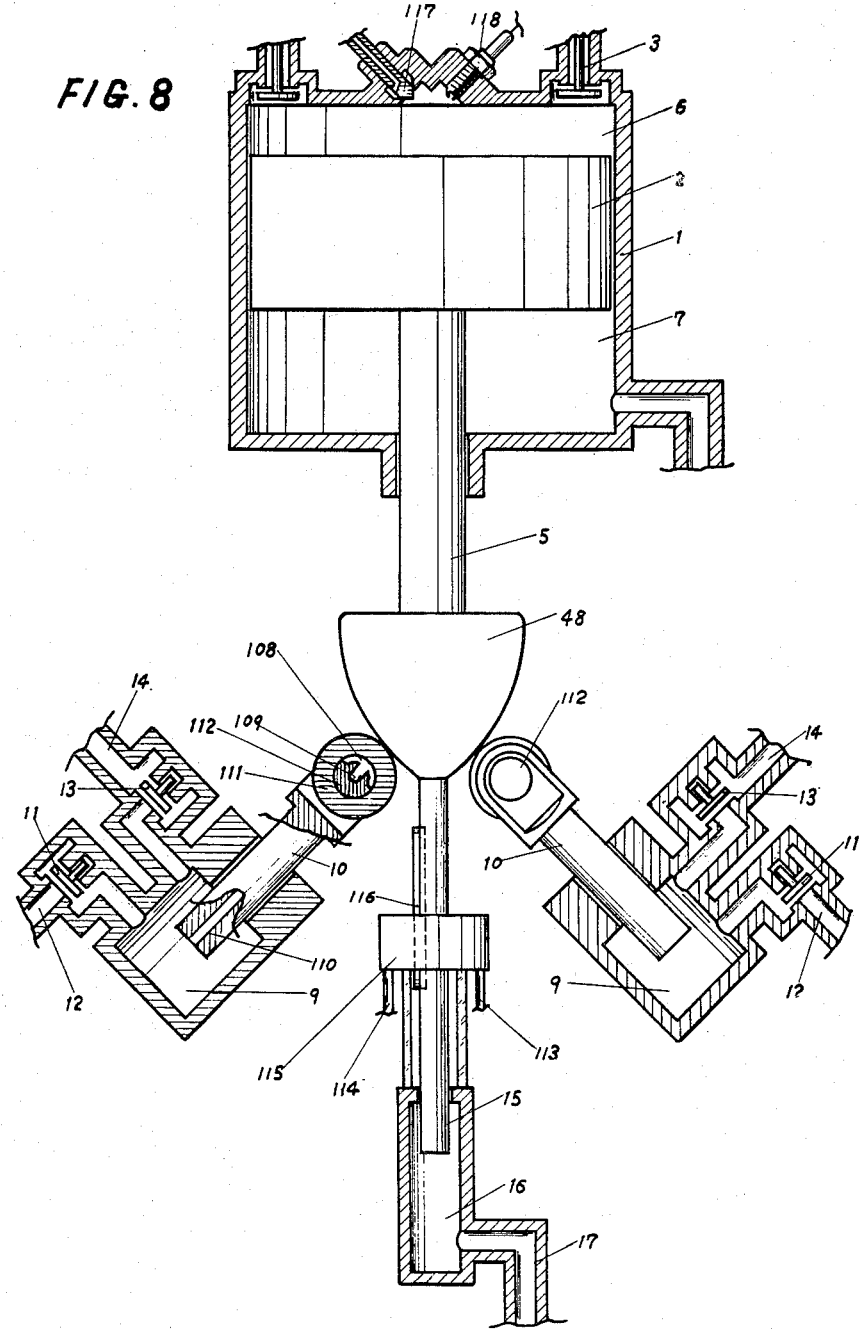

FIGURE 8 illustrates how the force-times-distance conditions occurring during the stroke of piston 2 may be adapted to the volume of pressure-medium conveyed. The piston movements may also be adapted in a similar manner to the periods of the combustion in cylinder 6. The efficiency of the combustion output and thus the total efficiency of the engine may thereby be increased. Piston rod 5 is for this purpose provided with cams 48 along which the pump pistons 10 may roll or slide. For reducing the friction, pump pistons 10 may be provided with rollers or wheels 111 which are mounted on bearing pins 112. In these bearing pins 112 or in pistons 10 balancing fields 108 may be provided into which the pressure-medium may be conducted from cylinder 9, for example, through the pressure lines 110 and 109. The pressures which are thus produced in the balancing fields 108 compensate other effective pressures either entirely or at least partly and thus reduce the friction losses. Pump pistons 10 are movable in pump chambers 9 in which they produce a pressure current through injection valves 11 and pressure valves 13. The advantage of this arrangement consists in the fact that cams 48 may be very accurately adapted to the release pressures on piston 2. Cams 48 should therefore extend more steeply at the beginning of the release stroke and effect a greater pumping stroke on pump pistons 10, while toward the end of the release stroke they effect at the same piston stroke a smaller pump piston stroke by the fact that cams 48 are straighter. Between the beginning and the end of the release stroke of piston 2 cams 48 may be adapted very accurately to the polytropic release within the combustion chamber. In this manner it is possible at different pressures in the combustion chamber to maintain a uniform pressure within the pump chamber 9, while the volume conveyed from the pump chamber 9 varies and is proportional to the output of energy delivered from the cylinder chamber. Piston rod 5 or the extension 15 thereof may be driven by rotary elements or rotary motors 115, and the connection between the rotary drive and the piston rod may be effected by conventional means, for example, by splines 116. By superimposing the rotary and reciprocating movements with each other the sliding and sealing conditions of the pistons, piston rings, and piston rods will be favorably influenced. The rotary motor 115 may be driven hydraulically or pneumatically, for example, by a pressure-medium which is passed into the motor through a line 113 and is discharged therefrom through a line 114.

In order to avoid lateral forces on piston rod 5, two or more pump pistons 10 may be arranged around cam 48 so that the resultance of these forces will neutralize each other in a lateral direction on piston rod 5.

Figure 9:
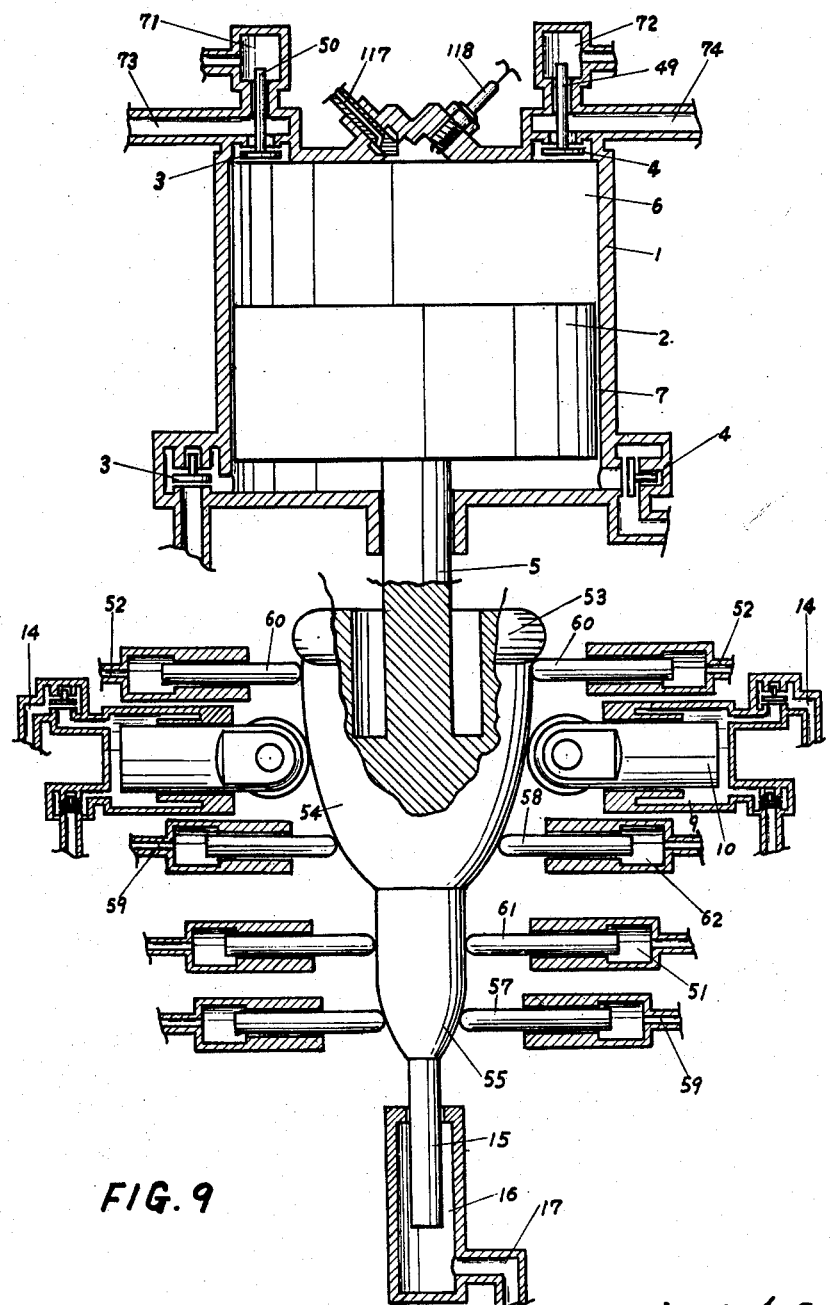

FIGURE 9 illustrates by another embodiment of the invention how the force-times-distance conditions may be adapted during the stroke of piston 2 to the volume of pressure-medium conveyed and how the stroke of piston 2 may at the same time be utilized for emitting hydraulic impulses for control or actuating mechanism. Piston rod 5 is for this purpose provided with cams 53, 54, and 55. Cam 53 actuates, for example, the displacement piston 60 which conducts the hydraulic impulse through the pressure line 52 to an injection device or ignition device of another engine cylinder. Cam 54 controls, for example, the pump pistons 10 which produce the pump medium energy and transmit the same through the pressure line 14. Cam 54 or another cam may also drive the impulse piston or pistons 58 which transmit the control pressure medium for the compression movement of another engine piston through the lines 62. Cam 55 may act upon the displacement piston or pistons 61, for example, for controlling one of the valves, and conduct the hydraulic impulse further through lines 51. The control cam 55 may also actuate one or more further displacement pistons 57 which may transmit further hydraulic impulses through lines 59, for example, for controlling a further valve. The cams or the impulse pistons may also be arranged in a different manner, for example, in such a manner on piston rod 5 that the impulses will drive the valves of the cylinders and the injection or ignition device.

The shafts of valves 3 and 4 may, for example, be designed in the form of hydraulic pistons, as indicated at 49 and 50. Pistons 49 and 50 may plunge into cylinders 71 and 72, respectively. If a pressure medium is then conducted through lines 73 or 74 into cylinder chambers 71 or 72, valves 3 or 4 may thereby be opened for a certain length of time and for a certain distance. If line 51 is connected to line 73 of another engine cylinder and if line 59 is connected to line 74 of the same other cylinder and line 62 is connected to line 17 of the same other cylinder, the effect will be attained that during the expansion stroke of piston 2 the valves and the compression stroke of another cylinder may be controlled very accurately by means of the different cams on piston rod 5 and the respective connecting lines. The same applies to the control of the ignition or injection device of another cylinder by means of cam 53 and the displacement piston 60.

Figure 10:
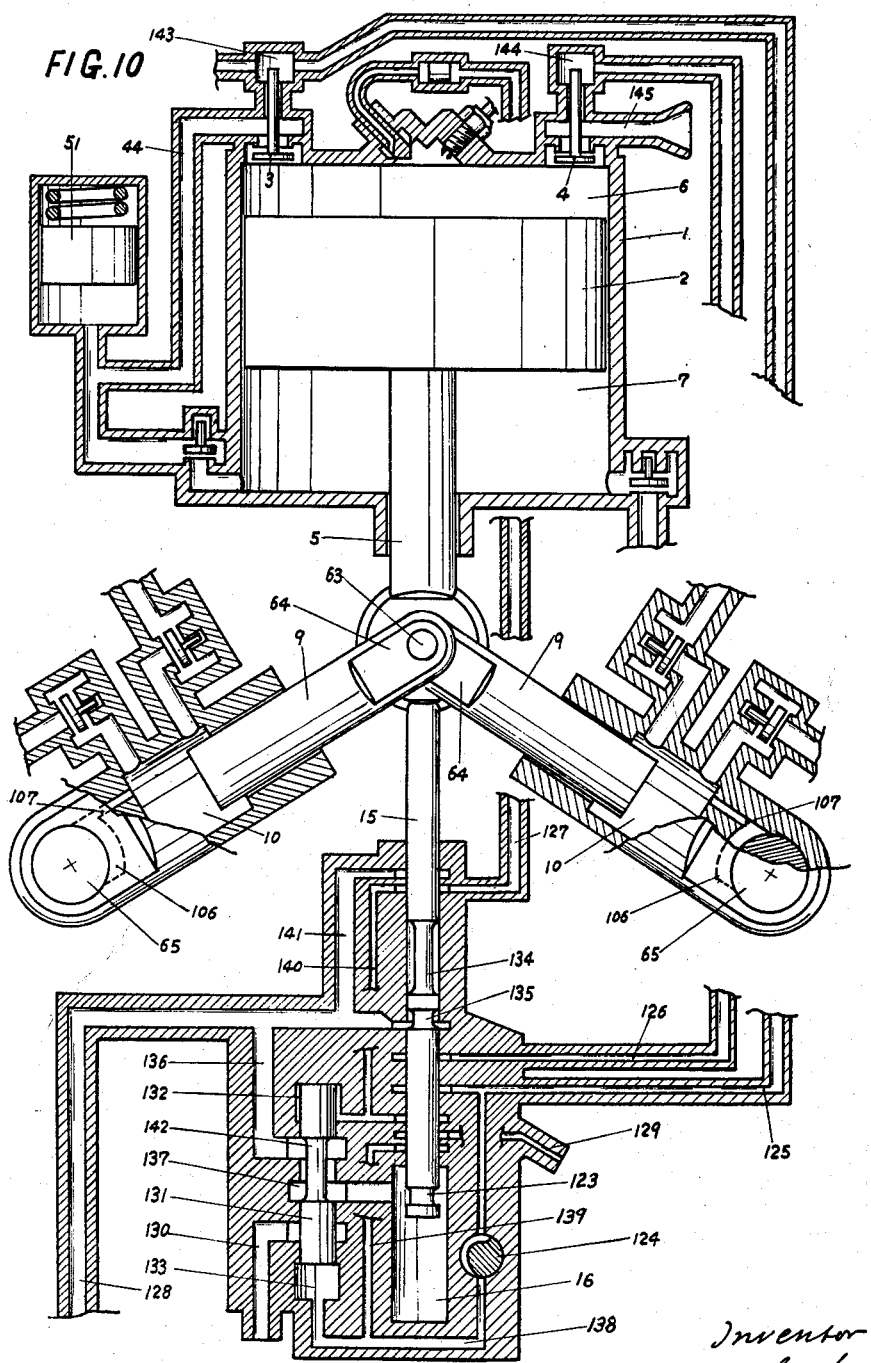

According to the further embodiment of the invention as illustrated in FIGURE 10, piston rod 5 is provided with a bore for receiving the piston 63 on which pump pistons 9 of cylinders 10 are mounted by means of bearing eyes 64. Pump pistons 9 are pivotably mounted by means of bearing pins 65. During the stroke of piston 2 the cylinders 10 together with pistons 9 carry out a pivotal movement about pins 65. According to this embodiment, bearing pins 63 and 65 may be arranged so that the force-times-distance characteristic of pump pistons 10 is at least substantially adapted to the force-times-distance characteristic of piston 2 of the combustion engine. This has the advantage that the bearings have to carry out only a part of one revolution at each work stroke about the pivot pins 63 and 65 and therefore incur very little friction, while the bearings of the crankshafts of conventional combustion engines must carry out at least one full revolution at each operation. If the pressure medium is conducted through channels 107 into the bearing pins 63 and 65 or the bearing eyes 64 or into the bearing eyes of pump cylinders 10, the medium forces in the balancing fields 106 will balance out entirely or at least partly any other forces acting thereon and thus reduce the frictional losses. The balancing fields 106 may, however, also be omitted.

The reciprocating movement of the piston rod may be utilized for controlling hydraulic impulses or hydraulic drives. For this purpose the piston rod may be designed in the form of a hydraulic control piston. In order to prevent any tilting or cocking, it is still more advisable to connect the piston rod pivotably to one or more hydraulic control pistons. The control piston or the piston acting as a control piston is then provided with control grooves, control edges, or the like. Thus, for example, FIGURE 10 illustrates one of the many possibilities of such a piston rod control. The control housing is supplied through the pressure line 128 with pressure medium which also branches off into the pressure lines 136 and 141. When the engine piston reaches the upper dead center or shortly prior to this time, the annular control groove 134 connects the pressure line 141 to the pressure lines 127 and 140. At the same time the annular control groove 123 connects the pressure line 139 to the return line 129. The pressure medium which is flowing into the pressure line 127 may drive a hydraulic piston which, in turn, drives the fuel injection device or the ignition device, and at the same time the pressure medium may flow through the pressure line 140 into the pressure chamber 132 and move the servo-control piston 131 to its opposite end position. The hydraulic medium may then escape from chamber 133 into the return line 129 through lines 138 and 139 and through the annular control groove 123 so that the servo-control piston 131 can enter into chamber 133. When the servo-piston 131 has completed the mentioned movement, the pressure line 137 is connected through the annular control groove 142 to the return line 130 so that the pressure medium can escape from the compression stroke cylinder 16 through lines 137 and 130 to the outside without incurring any noticeable resistance. The main piston may thus start its expansion movement and the piston rod extension 15 may plunge into the cylinder chamber 16. Shortly prior to the lower dead-center position, the control groove 134 connects the pressure line 128 to the pressure line 126 so that the pressure medium flows through the pressure line 126 into the outlet valve cylinder 144 and opens the outlet valve 4. At the further movement to the lower dead-center, the annular control groove 134 connects the pressure lines 128 and 125 with each other and the annular control groove 135 connects the pressure line 140 and the return line 129 with each other. Additional pressure medium which is contained in pressure line 128 under pressure may thereby flow through the pressure line 125 into the hydraulic cylinder 143 and thereby also open the inlet valve 3 through which the cylinder may be charged from line 44 and the pressure accumulator 51. At the same time, pressure medium flows from pressure line 125 through the pressure line 138 into chamber 133 whereby servo-piston 131 is forced into chamber 132. The pressure medium escapes from chamber 132 through the annular control groove 135 and the return line 129, and after servo-piston 131 has again connected the pressure line 136 with the cylinder chamber 16, the compression stroke and thus the engine cycle are started anew. In order to prolong the valve-opening period, delaying throttles 124 or control throttles 124 may be connected into the lines, for example, into the pressure line 138.

Figure 11:
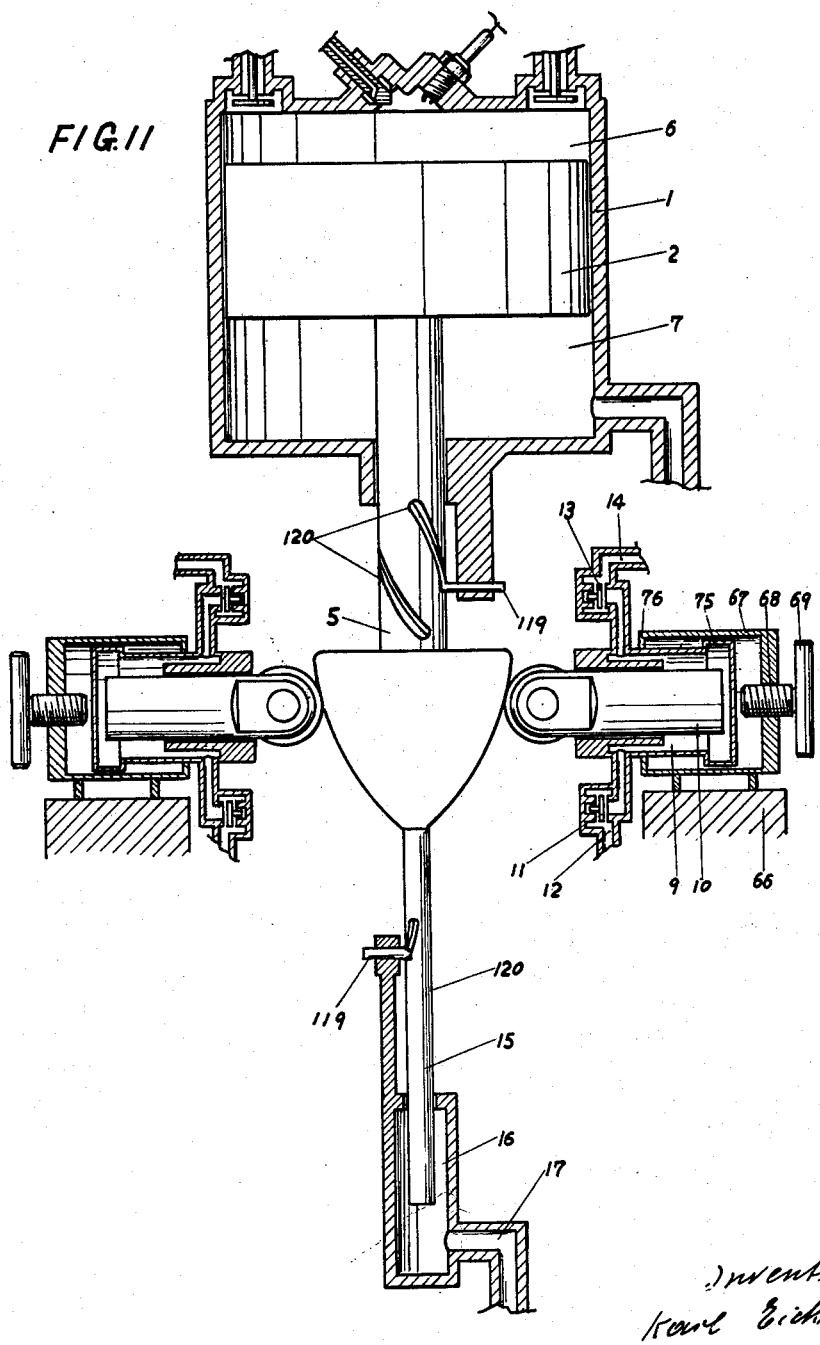
FIGURES 11 and 12 show two further modifications of the engines according to the invention which are provided with a control of the pressure medium.

FIGURE 11 illustrates an example of the manner in which the volume of pressure medium may be controlled. Insofar as the operation of the main piston, the main cylinder, the piston rod, and the cam on the piston rod are concerned, this embodiment may be designed similarly to the other embodiments as, for example, according to FIGURES 8 or 9. The particular novelty of this embodiment over those previously described consists in the fact that the volume of the pressure medium conveyed which is produced by the pump piston 10 in pump cylinder 9 may be controlled independently of the velocity of the strokes of the main piston. Pump cylinder 9 is for this purpose slidably mounted within a guide bushing 67 which is mounted at 66 in a stationary position in any suitable manner, for example, on the engine base. Guide bushing 67 is provided with a set screw 68 which is disposed axially behind the pump cylinder 9. Guide bushing 67 is further provided with stops 76 and pump cylinder 9 with stops 75. Pump cylinder 9 is movable in the axial direction in guide bushing 67. In the forward direction, its movability is limited by the stops 76 and 75, while toward the rear its movability is limited by setscrew 68. If setscrew 68 is screwed back, pump cylinder 9 may yield toward the rear when piston 10 carries out its stroke and cam 48 presses the pump piston 10 into the pump cylinder 9. If setscrew 68 is screwed back entirely, pump cylinder 9 may yield entirely under the pressure of cam 48, so that the volume of pressure medium conveyed by the pump consisting of piston 10 and cylinder 9 is zero. The more the setscrew 68 is tightened, the more limited will be the movability of pump cylinder 9. If setscrew 68 is screwed in entirely, pump cylinder 9 can no longer yield and pump piston 10 will then deliver the full volume of pressure medium. Intermediate these two positions, the amount of medium conveyed is infinitely variable by an adjustment of setscrew 68. For starting the combustion engine and for the idle operation thereof the setscrew 68 is preferably screwed back completely in order to save fuel.

In place of the cylindrical guide bushing 67 it is also possible to employ other guiding means for the pump cylinder 9. For controlling and limiting the stroke of pump cylinder 9 it is also possible to employ other stop means or control means. Such control means may also be remote-controlled or automatically controlled. By the provision of helical grooves 120 and pins 119 or other suitable driving elements it is also possible to give the piston 2 an additional rotary movement so as to reduce its friction and increase the length of its useful life.

Figure 12:
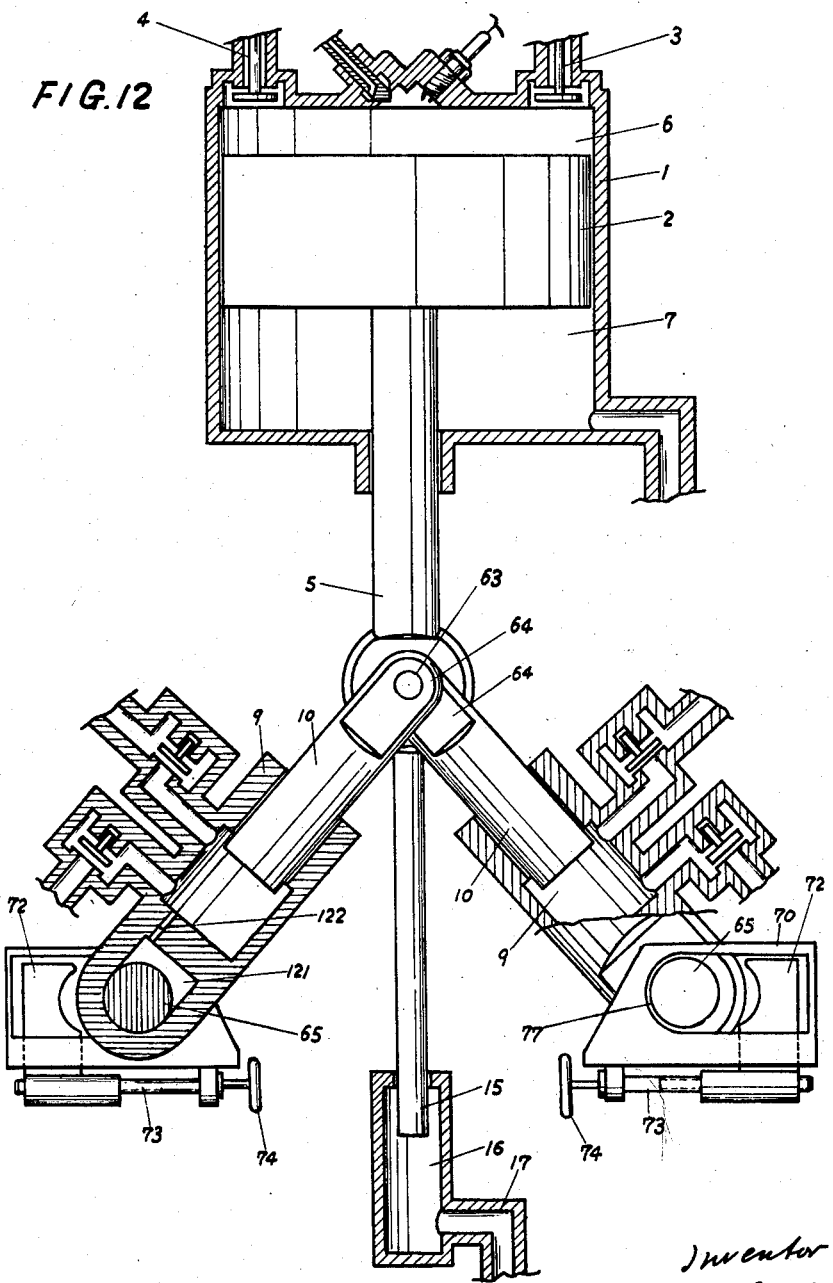

FIGURE 12 illustrates on a further embodiment of the invention another manner in which the volume of pressure medium may be controlled. Insofar as the construction of the main cylinder, the main piston, the piston rod, the pump pistons 10 and pump cylinders 9 are concerned, the engine according to FIGURE 12 corresponds to the engine according to FIGURE 10. The particular novelty of this embodiment resides in the fact that the bearing pin 65 of pump cylinder 9 is mounted in a guide 70 in which it is movable between the front stop 77 and a rear stop 72. The guide bed 70 is mounted in a stationary position, for example, on the engine housing, or it is integral with the latter. The rear stop 72 may be adjusted by a spindle 73 by means of a handwheel 74.

If the stop 72 is in its rear end position, pump cylinder 9 and its bearing pin 65 can move in guide 70 to such an extent that at the movement of the engine piston 2 with its piston rod 5 no pressure will be formed in pump cylinder 9 and the pump will not deliver any pressure medium. The more the stop 72 is tightened, for example, by means of spindle 73, the more the movability of cylinder 9 with bearing pin 65 will be limited in guide 70 and the greater will be the volume of pressure medium conveyed from the pump cylinder 9. If the bearing pin 65 is stopped completely by the stop 72, the amount of pressure medium conveyed from pump cylinder 9 reaches its maximum. An adjustment of stop 72 permits an infinite variation of the amount of pressure medium conveyed from the pump cylinder 9. Cylinders 9 may be mounted so as to incur very little friction by means of pressure-balancing fields 121 which may be supplied with pressure medium through lines 122.

The manner in which pump cylinder 9 according to FIGURE 12 is mounted or constructed only forms one of many possibilities. The adjustability and the manner of limiting and freeing the movement of the guiding means of pump cylinder 9 may also be differently designed. It may also be adjusted and controlled by different mechanical means, by hand, hydraulically, electrically, or by a motor. Also, a remote control or an automatic adjustment is possible.

Figure 13:
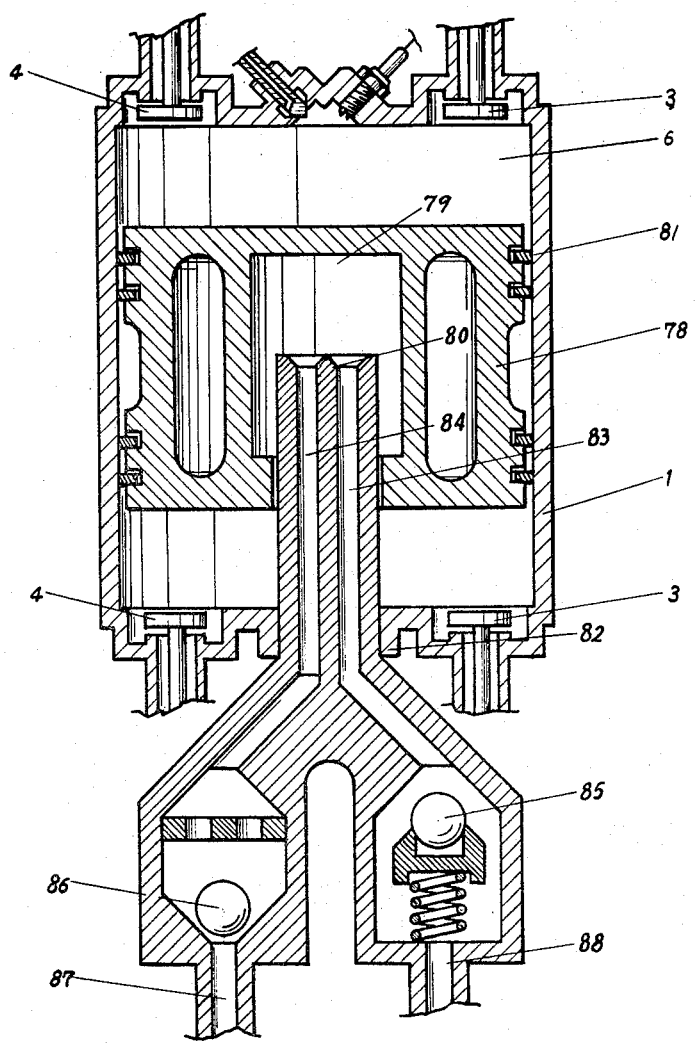

FIGURE 13 illustrates a combustion engine according to the invention which requires very little space and material. The essential parts such as the cylinder 1, piston 78, valves 3 and 4, and the injection or ignition device may operate in the usual manner. The inventive simplification resides in the fact that the pump chamber 79 for pumping a sealing medium is contained within the piston 78 and that the pump piston or piston rod 80 extends into the pump chamber 79. During the reciprocating movement of the engine piston 78, pump chamber 79 is therefore enlarged or reduced since the shaft 80 of the pump piston is rigidly connected to the engine cylinder 1. When the pump chamber 79 is being enlarged, the pump medium is sucked in through the induction valve 86 and the induction line 84. When the pump chamber 79 is being reduced, the pump medium is forced out through the pressure line 83 and the pressure valve 85.

The pump medium is fed to the engine through the line 87 and it is discharged through the line 88. Shaft 80 of the pump piston is rigidly secured within the flange 82 of the engine cylinder 1. The pump medium lines 83 and 84 are provided at the inside of the shaft 80. The point of entry of shaft 80 of the pump piston into the engine piston 78 or into the piston chamber 79 is sealed, for example, by a tight fit or a special sealing gasket or the like. The lower cylinder chamber 7 may be utilized for a preinjection or supercharging of air or a mixture or fuel and air or also for burning the gases. Engine piston 78 may be made hollow to reduce its weight and it may be provided in the usual manner with piston rings.

FIGURE 14 finally shows how a high output may be concentrated to drive one or several individual hydraulic engines by connecting a number of small engines according to the invention in parallel. The parallel engines 89 may be operated so that the ignition or the fuel injection occurs successively. The charging or injection may occur through one or several common injection lines 94 and through further feed lines 90, possibly under preliminary pressure which may be produced by a blower 102 acting upon line 94. The cylinder chambers 7 may convey the medium, for example, through lines 99 into the feed line 94 and draw in the medium through the injection lines 88. The exhaust gases may be conveyed through the exhaust lines 91 into the common exhaust line 95. The pump medium may be supplied from the common feed line 96 through lines 92. Feed line 96 may also be placed under pressure by a pressure pump 103 and a pressure medium. The pressure medium conveyed may pass through lines 93 and the common pressure line 97 to drive one or more hydraulic engines 104. From the hydraulic engine 104, the hydraulic medium may pass through the return line 101 into the feed line 96 or at an open circuit into the tank. By means of the shutoff valves 105, one or more engines may be disconnected from or connected to the engine battery.

The present invention is by no means limited to the particular embodiments thereof as illustrated and described. In particular, slide or slot controls may be employed in place of valves, and in place of the hydraulic controls for the valves, ignition devices and the compression strokes, it is possible to provide mechanical transmitting means or controls. In place of the camshafts and cams, hydraulic slide controls or rotary piston controls may be employed which at certain times release certain amounts of pressure medium from accumulators or pressure lines for carrying out the different control or other movement, such as, for example, the compression stroke, the opening of the valves, the injection of the fuel, the ignition, etc. The cam shafts may be driven mechanically or by means of hydraulic engines. Frequently it is possible to combine certain features of the individual embodiments with each other. In place of the cams as illustrated it is also possible to employ flat cams or the like on the piston rods 5.

Having thus fully disclosed my invention, what I claim is:

1. A free piston engine comprising a main cylinder; a main piston reciprocably mounted in said main cylinder and defining with the same a first chamber and a second chamber, said main piston having a piston rod projecting out of said main cylinder; means for producing combustion in at least said first chamber whereby said main piston is driven in one direction in an expansion stroke; said piston rod having outside of said main cylinder an intermediate portion, and an end portion formed as an auxiliary piston; pump means connected to and driven by said intermediate portion; an auxiliary cylinder receiving said auxiliary piston; a secondary pump having a reciprocable member and communicating with said auxiliary cylinder for supplying and exhausting pressure fluid during reciprocation of said reciprocable member; and rotary cam means for reciprocating said reciprocable member in timed relation with the reciprocation of said main piston so that pressure fluid is discharged from said auxiliary cylinder to said secondary pump during the expansion stroke of said main piston whereas pressure fluid supplied from said secondary pump means to said auxiliary cylinder moves said auxiliary piston in a direction opposite to said one direction whereby said main piston is moved in a compression stroke.

2. A free piston engine comprising a plurality of main cylinders; a main piston reciprocably mounted in each main cylinder and defining with the same a chamber, said main piston having a piston rod projecting out of said main cylinder; means sequentially producing combustion in said chambers of said main cylinders whereby said main pistons are successively driven in one direction of reciprocation in an expansion stroke, each piston rod having outside of said main cylinder an intermediate portion, and an end portion formed as an auxiliary piston; pump means connected to and driven by each intermediate portion; an auxiliary cylinder receiving each auxiliary piston; a plurality of secondary pumps, each having a reciprocable member and communicating with one of said auxiliary cylinders for supplying and exhausting pressure fluid during reciprocation of said reciprocable members; and rotary cam means sequentially reciprocating said reciprocable member in timed relation with the sequential reciprocation of said main pistons so that pressure fluid is discharged from each auxiliary cylinder to the respective secondary pump during the expansion stroke of the respective main piston whereas pressure fluid is successively supplied from said secondary pump means to said auxiliary cylinders and moves said auxiliary pistons in a direction opposite to said one direction whereby said main pistons are moved in a compression stroke.

3. A free piston engine comprising a plurality of main cylinders; a main piston reciprocably mounted in each main cylinder and defining with the same a chamber, said main piston having a piston rod projecting out of said main cylinder; fuel injection means, inlet valve means and outlet valve means for said chambers of said main cylinders whereby said main pistons are successively driven in one direction of reciprocation in an expansion stroke, each piston rod having outside of said main cylinder an intermediate portion, and an end portion formed as an auxiliary piston; pump means connected to and driven by each intermediate portion; an auxiliary cylinder receiving each auxiliary piston; a plurality of secondary pumps, each having a reciprocable member and communicating with one of said auxiliary cylinders for supplying and exhausting pressure fluid during reciprocation of said reciprocable members; rotary cam means for sequentially reciprocating said reciprocable member in timed relation with the sequential reciprocation of said main pistons so that pressure fluid is discharged from each auxiliary cylinder to the respective secondary pump during the expansion stroke of the respective main piston whereas pressure fluid is successively supplied from said secondary pump means to said auxiliary cylinders and moves said auxiliary pistons in a direction opposite to said one direction whereby said main pistons are moved in a compression stroke; and a plurality of other secondary pump means having reciprocable members sequentially operated by said cam means, said other secondary pump means being adapted to sequentially actuate said fuel injection means, said inlet valve means and said outlet valve means of said main cylinders.

References Cited in the file of this patent

UNITED STATES PATENTS

| | | |
|---|---|---|
| 1,349,394 | Trump et al. | Aug. 10, 1920 |
| 2,306,131 | Lossau | Dec. 22, 1942 |
| 2,391,972 | Hufford et al. | Jan. 1, 1946 |
| 2,661,592 | Bright | Dec. 8, 1953 |
| 2,666,569 | Bent | Jan. 19, 1954 |
| 2,820,415 | Born | Jan. 21, 1958 |
| 2,872,778 | Dane | Feb. 10, 1959 |
| 2,882,685 | Carlsen et al. | Apr. 21, 1959 |
| 2,946,287 | Bessiere | July 26, 1960 |
| 2,978,986 | Carder et al. | Apr. 11, 1961 |
| 2,991,773 | Cadiou | July 11, 1961 |